United States Patent [19]
Lay

[11] Patent Number: 6,036,596
[45] Date of Patent: Mar. 14, 2000

[54] APPARATUS AND METHOD FOR REMOVING MEAT FROM A CRAWFISH TAIL

[76] Inventor: Robert Lay, 112 Greentree, Alvin, Tex. 77511

[21] Appl. No.: 08/821,290

[22] Filed: Mar. 20, 1997

[51] Int. Cl.[7] .................................................. A22C 29/02
[52] U.S. Cl. ...................................... 456/6; 452/2; 452/17
[58] Field of Search .................................... 452/6, 2, 3, 5, 452/17

[56] References Cited

U.S. PATENT DOCUMENTS

| | | | |
|---|---|---|---|
| 2,594,205 | 4/1952 | Paoli | 452/3 |
| 2,707,325 | 5/1955 | Cripps | 452/6 |
| 2,819,487 | 1/1958 | Joseph | 452/3 |
| 2,832,987 | 5/1958 | DiCamillo | 452/3 |
| 4,553,287 | 11/1985 | DeSordi et al. | 453/3 |

FOREIGN PATENT DOCUMENTS 49725  1/1935  Denmark ................................... 452/6

*Primary Examiner*—Willis Little
*Attorney, Agent, or Firm*—Harrison & Egbert

[57] ABSTRACT

A crawfish shelling tool including a handle, and a wire extending outwardly from one end of the handle. The wire has a generally U-shaped configuration. A closed end of the U-shaped configuration is opposite the handle. The wire is a high-tensile strength steel wire having a diameter of no more than 1/32 of an inch. The wire has a first side extending outwardly from an end of the handle, and a second side extending outwardly from the end of the handle. The second side is in coplanar relationship with the first side. The closed end is a curved end which connects an end of the first side with an end of the second side. The curved end forms an approximately 180° curve. The first side and the second side taper inwardly toward the curved end.

14 Claims, 1 Drawing Sheet

APPARATUS AND METHOD FOR REMOVING MEAT FROM A CRAWFISH TAIL

TECHNICAL FIELD

The present invention relates to devices for cleaning crawfish. More particularly, the present invention relates to devices for removing the meat from the tail of a crawfish shell.

BACKGROUND ART

There are two major edible small crustceous in common use as food within the United States. The primary crustacean is the common shrimp, which is relatively familiar to almost all persons in the United States. The shrimp has a relatively thin exoskeleton, or shell, which is easily peeled by hand from the shrimp body either while the shrimp is raw or while the shrimp is cooked. In addition the shell is quite thin, very flexible, and has a marked spinal division or crease, all of which have led to the widespread introduction and invention of numerous methods of automatically peeling shrimp. These methods in general take advantage of the fact that under compressive pressure shrimp meat is generally extruded intact from the very flexible shell. Alternately, the machinery takes advantage of the fact that the shrimp shell, especially on raw shrimp, is easily cut by knives while avoiding cutting the shrimp meat.

The crawfish is a much less widely exploited crustacean. Although it is extremely popular as a staple food item in Southern Louisiana, and has a marked acceptance, although less exploitation, among persons, especially of Scandanavian descent, within the Central and Midwestern United States, it is relatively unknown as a food item in the rest of the country.

Like the shrimp, the crawfish has almost all of its edible meat in the tail section; and the head of the crawfish must be removed. Unlike the shrimp, however, the crawfish most closely resembles a small Maine lobster, having large meat containing claws and an extremely stiff and hard exoskeleton. Like the lobster, the crawfish when cooked turns a bright red. When removed from cooking, the crawfish tail is tightly curved; the meat in a rigid, plate-like shell, extremely resistant to cutting, having a marked brittleness and a low ductility.

The normal method of eating a crawfish, which requires that the crawfish meat be removed from the shell, involves breaking the crawfish, and removing the head piece which contains little edible matter, straightening the shell with the fingers, and attempting to squeeze the shell, much in the manner of squeezing a tube of toothpaste from the bottom.

If the hungry gourmet or afficionado has developed the right touch of finger and forefinger, he quite often can squeeze out the crawfish meat. More often, the meat either breaks, leaving a portion in the shell, or it does not come out at all. At this point, the by now probably famished diner is reduced to attempting to piecemeal dissemble a shell structure as impervious as that found in a lobster tail but approximately 1/10th the size.

Crawfish is a very succulent meat comparable to the lobster in flavor but considerably more delicate. In addition crawfish can be raised readily as an adjunct to rice farming. The crawfish life cycle matches the flood and drainage cycle in standard rice culture. Crawfish are completely compatible with the operation of a rice field, and as a result many rice farmers raise crawfish as a second crop. However, the general difficulty of eating crawfish has restricted the market essentially to a very small subgroup within Louisiana and a few related states who, for cultural reasons, or out of familiarity with the crawfish, look upon it as a preferential food.

The difficulty of eating the crawfish, the small amount of meat that is obtained for a considerable amount of physical labor when hand shucking crawfish, have all combined to restrict the widespread acceptance of crawfish as an alternative to shrimp as in a seafood. This has been reflected most recently in a severe overproduction of crawfish in Southern Louisiana and a consequent severe drop in the price. The crawfish industry is apparently at a saturation point in terms of providing adequate crawfish supplies to those customers currently within its market. Any further production and any further expansion of this particular industry will depend upon an expended customer base, which in turn will depend upon a solution of the problem of removing the meat from the crawfish. As a comparison, the current shrimp industry is a creature of the invention of automated means for removing shrimp meat from the shrimp shell. Shrimp factories are now the primary direct market for the shrimp fisherman.

It should be noted that some of the disadvantages of peeling crawfish are: (1) the spicy, staining juice that is produced from boiling the crawfish often flies from the custacean while attempting to hand peel; (2) while peeling the sections of the shell, you often find that a force sufficient to break apart the shell can be painful to your fingers; and (3) it should also be noted that a drawback in eating crawfish is due to the difficulty small children have peeling them. So, in turn, while peeling your child's crawfish, your own become cold and undesirable.

U.S. Pat. No. 4,524,490 describes a crawfish peeler device which is designed for removing the meat from a crawfish tail. This device has a handle adapted to the human hand and contains a pair of spring-biased opposed elongated concave tongs with curved inward tips. The crawfish peeler is inserted into the tail. The tongs pass along the crawfish tail meat within the lower shell. The peeler serves to break the individual ligamentary connections between the crawfish meat and the crawfish tail. The tongs are then squeezed tightly together by the hand and withdrawn. The meat will accompany the tongs upon the removal of the tongs. Unfortunately, this device requires perhaps greater manipulation than the simple removal of the meat from the crawfish tail in conventional fashion. This is also a relatively expensive apparatus to manufacture.

It is an object of the present invention to provide a method and apparatus for removing the meat from a crawfish shell which effectively removes the meat in a convenient and easy manner.

It is another object of the present invention to provide a method and apparatus for removing the meat from a crawfish tail which requires a minimum of manipulation.

It is still a further object of the present invention to provide a method and apparatus for removing the meat from a crawfish tail which is easy to manufacture and is relatively inexpensive.

These and other objects and advantages of the present invention will become apparent from a reading of the attached specification and appended claims.

SUMMARY OF THE INVENTION

The present invention is a crawfish shelling tool which comprises a handle, and a wire extending outwardly from one end of the handle. The wire has a generally U-shaped configuration. A closed end of the U-shaped configuration is opposite the handle. The wire is a high-tensile strength steel wire. The wire should have a diameter of no more than 1/32 of an inch. In particular, the wire has a first side extending outwardly from an end of the handle and a second side extending outwardly from an end of the handle. The second side is in coplanar relationship with the first side. A curved end connects an end of the first side with an end of the second side. This curved end forms an approximately 180° curve. The first side and the second side taper inwardly toward the curved end. The first side and second side are separated by a greater distance adjacent to the handle. The first and second sides have ends opposite the curved end which extending transversely inwardly so as to connect with the handle.

The handle has a generally flat top surface and a generally flat bottom surface. The wire extends outwardly from between the top surface and the bottom surface. The handle has a generally oval configuration.

The present invention is also a method for removing meat from a crawfish shell which comprises the steps of: (1) forming a tool having a handle with a wire extending outwardly therefrom; (2) removing a head of the crawfish from the crawfish shell; (3) inserting the wire into the crawfish shell such that the wire is interposed between the meat and the shell; (4) twisting the handle back and forth such that the wire cuts into the meat within the shell; and (5) pulling the handle such that the meat is removed by the wire.

This method further includes the steps of grasping the handle prior to inserting the wire into the crawfish shell. The method further includes the step of pushing the handle such that the wire spreads outwardly so as to contact the interior sides of the shell. The handle is rotated while pushing on the handle such that the wire will scrape the interior sides of the shell so as to cut through the ligamentary connections between the crawfish meat and the shell of the crawfish.

DETAILED DESCRIPTION OF THE INVENTION

Figure 1:
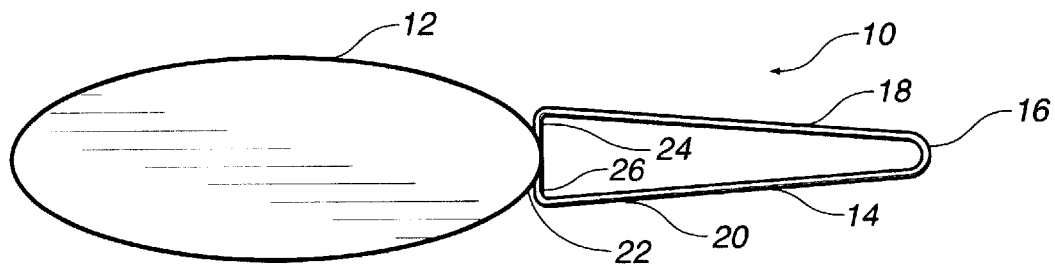
FIG. 1 is a plan view of the tool of the present invention.

Referring to FIG. 1, there is shown at 10 the crawfish shelling tool in accordance with the preferred embodiment of the present invention. The crawfish shelling tool 10 includes a handle 12 and a wire 14 extending outwardly from one end of the handle. As can be seen in FIG. 1, the wire 14 has a generally U-shaped configuration. A closed end 16 of the wire 14 is located opposite to the handle 12. The wire is a high-tensile strength steel wire having a diameter of no more than 1/32 of an inch.

In the present invention, the wire 14 has a first side 18 and a second side 20. The first side 18 extends outwardly from an end 22 of the handle 12. The second side 20 extends outwardly from the end 22 of the handle. The second side 20 is in coplanar relationship with the first side 18. The curved end 16 serves to connect an end of the first side 18 with an end of the second side 20. The curved end 16 forms an approximately 180° curve. The first side 18 and the second side 20 taper inwardly toward the curved end 16. The first side 18 and the second side 20 are separated by a greater distance adjacent the end 22 of the handle 12. In the preferred embodiment of the present invention, the first side 18 will be separated from the second side 20 by no less than 1/8 of an inch. The first side 18 has an inwardly extending portion 24 extending transversely inwardly from the end of the first side 18 opposite the curved end 16. This transversely inwardly extending portion 24 connects with the end 22 of the handle 12. Similarly, the second wire 20 has a transversely inwardly extending portion 26 which also serves to connect with the end 22 of the handle 12.

In the present invention, the wire 14 should have a sufficient flexibility so as to bow outwardly when the tool 10 is inserted into the crawfish tail. When the curved end 16 abuts an interior surface of the crawfish tail, the sides 18 and 20 will bow outwardly so as to contact the inner surface of the crawfish shell. The sides 18 and 20 should have a sufficient cutting ability so as to cut through the ligamentary connections between the crawfish meat and the crawfish shell.

In FIG. 1, it can be seen that the handle 12 has a generally oval configuration. The handle 12 is designed so as to be easily grasped between the thumb and forefinger on a human hand. The handle 12 should be suitable so as to apply pressure for the deformation of the sides 18 and 20. The transversely inwardly extending portions 24 and 26 facilitate the ability of the handle 12 to cause the sides 18 and 20 to bow outwardly after the wire 14 is inserted into the crawfish tail.

Figure 2:
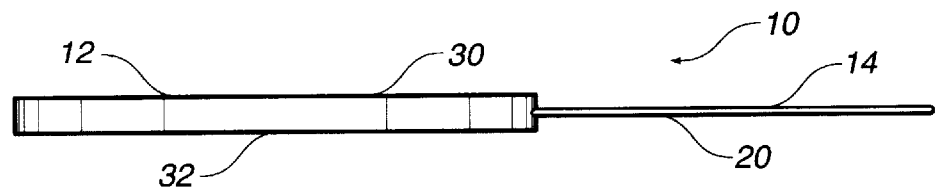
FIG. 2 is a side elevational view of the tool of the present invention.

FIG. 2 is a side view of the tool 10. It can be seen that the wire 14 has its side 20 in coplanar relationship with side 18. The handle 12 has a top side 30 and a bottom side 32. The wire 14 is attached to the handle 12 between the top side 30 and the bottom side 32.

Figure 3:
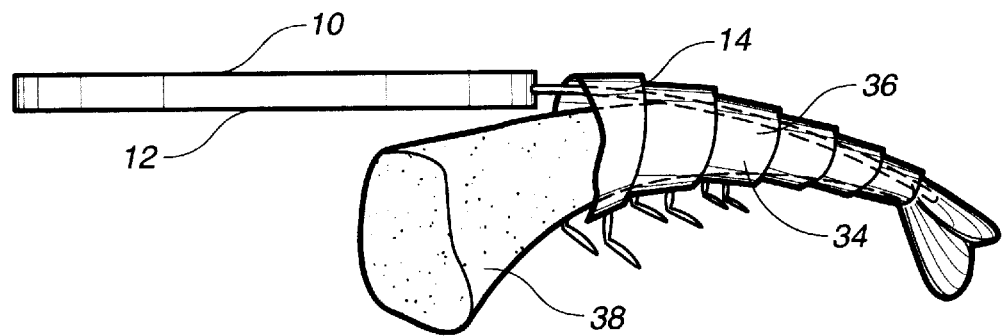
FIG. 3 is an illustration showing how the present invention can be used so as to separate crawfish meat from a crawfish shell.

FIG. 3 shows generally the manner in which the tool 10 of the present invention can be used so as to separate the meat from a crawfish tail 34. Initially, with reference to FIG. 3, the head of the crawfish has been separated from the tail of the crawfish. As such, a shell 36 will extend around the meat 38 of the crawfish 34. The wire 14 is inserted into the crawfish shell 36 such that the wire 14 is interposed between the meat 38 and the inner surface of the shell 36. The handle 12 will extend outwardly from the shell 36. The handle 12 is twisted back and forth such that the wire 14 will cut into the meat 38 on the interior of the shell 36. The handle 12 is then pulled outwardly so that the meat 38 is removed by the wire 14 from the shell 36.

The present invention is particularly unique since the handle 12 should be pushed so that the wire 14 enters the shell 36 and the wire 14 spreads outwardly so as to contact the interior sides of the shell 36. The handle 12 is rotated while pushing on the handle 12 such that the wire 14 will scrape the interior sides of the shell 36 so as to break the individual ligamentary connections between the crawfish meat 38 and the shell 36. As such, the tool 10 of the present invention is extremely useful for the removal of the meat 38 in a convenient, simple and easy manner. The present invention does not require the manipulation of tongs nor does it require any real controlled application of pressure.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A crawfish shelling tool comprising:

a handle; and a wire extending outwardly from one end of said handle, said wire having a generally U-shaped configuration, a closed end of said U-shaped configuration being opposite said handle, said wire comprising:

a first side extending outwardly from an end of said handle; and a second side extending outwardly from said end of said handle, said second side in coplanar relationship with said first side.

2. The tool of claim 1, said wire being a high-tensile strength steel wire, said wire having a diameter of no more than 1/32 of an inch.

3. The tool of claim 1, said closed end comprising:

a curved end connecting an end of said first side with an end of said second side.

4. The tool of claim 3, said curved end forming an approximately 180° curve.

5. The tool of claim 3, said first side and said second side tapering inwardly toward said curved end, said first side and said second side being separated by a greater distance adjacent said handle.

6. The tool of claim 5, said first side having an end opposite said curved end extending transversely inwardly so as to connect with said handle, said second side having an end opposite said curved end extending transversely inwardly so as to connect with said handle.

7. A crawfish shelling tool comprising:

a handle; and a wire extending outwardly from one end of said handle, said wire having a generally U-shaped configuration, a closed end of said U-shaped configuration being opposite said handle, said handle having a generally flat top surface and a generally flat bottom surface, said wire extending outwardly from between said top surface and said bottom surface.

8. The tool of claim 7, said handle having a generally oval configuration.

9. A crawfish shelling tool comprising:

a handle; and a wire extending outwardly from said handle, said wire having a first side extending outwardly from an end of said handle and a second side extending outwardly from said end of said handle, said second side being in coplanar relationship with said first side, said wire further having a curved end connecting an end of said first side with an end of said second side, said wire being a high-tensile strength steel wire having a diameter of no more than 1/32 of an inch, said first side and said second side tapering inwardly toward said curved end, said first side and said second side being separated by a greater distance adjacent said handle.

10. The tool of claim 9, said curved end forming an approximately 180° curve.

11. The tool of claim 9, said first side having an end opposite said curved end extending transversely inwardly so as to connect with said handle, said second side having an end opposite said curved end extending transversely inwardly so as to connect with said handle.

12. The tool of claim 9, said handle having a generally flat top surface and a generally flat bottom surface, said wire extending outwardly from between said top surface and said bottom surface.

13. The tool of claim 12, said handle having a generally oval configuration.

14. The tool of claim 9, said first side being separated from said second side by no less than 1/8 inch.

* * * * *